US011681295B2

(12) United States Patent
Jang et al.

(10) Patent No.: US 11,681,295 B2
(45) Date of Patent: Jun. 20, 2023

(54) ROBOT AND METHOD OF DELIVERING ARTICLES BY THE ROBOT

(71) Applicant: LG ELECTRONICS INC., Seoul (KR)

(72) Inventors: Yu June Jang, Seoul (KR); Hyoungmi Kim, Seoul (KR); Jin Won Kang, Seongnam-si (KR)

(73) Assignee: LG ELECTRONICS INC., Seoul (KR)

( * ) Notice: Subject to any disclaimer, the term of this patent is extended or adjusted under 35 U.S.C. 154(b) by 582 days.

(21) Appl. No.: 16/838,314

(22) Filed: Apr. 2, 2020

(65) Prior Publication Data

US 2021/0096572 A1    Apr. 1, 2021

(30) Foreign Application Priority Data

Sep. 26, 2019   (KR) .......................... 10-2019-0119126

(51) Int. Cl.
*G05D 1/02* (2020.01)
*G05B 13/02* (2006.01)
(Continued)

(52) U.S. Cl.
CPC ......... *G05D 1/0217* (2013.01); *G05B 13/027* (2013.01); *G05D 23/1917* (2013.01);
(Continued)

(58) Field of Classification Search
CPC ............. G05D 1/0217; G05D 23/1917; G05D 2201/0216; G05B 13/027; G06N 3/04;
(Continued)

(56) References Cited

U.S. PATENT DOCUMENTS 11,222,378 B2 *   1/2022   Ferguson ............... B60R 25/252
2016/0371642 A1 *  12/2016  Wilkinson ......... G06Q 10/0832
(Continued)

FOREIGN PATENT DOCUMENTS

KR   10-2015-0045724 A      4/2015
KR   10-2018-0123298 A     11/2018
WO   WO-2019238865 A1 *   12/2019   ....... G06Q 10/06315

*Primary Examiner* — Calvin Cheung
(74) *Attorney, Agent, or Firm* — Birch, Stewart, Kolasch & Birch, LLP

(57) ABSTRACT

Disclosed are a robot and a method for delivering articles by the robot. A robot, according to an embodiment of the present disclosure, includes: one or more loading spaces configured to load articles; a travel driver configured to move the robot; an input interface configured to obtain identification information of the articles; a measurer configured to measure temperature of each of the articles; a temperature regulator configured to heat or cool the loading spaces; and a controller configured to determine a type of each of the articles from the identification information, determine a delivery route based on the determined type of article, and control the temperature regulator based on the measured temperature while controlling the travel driver such that the robot moves along the determined delivery route. Examples of the present disclosure are implemented by executing a machine learning algorithm in a 5G environment connected for Internet of things (IoT).

19 Claims, 11 Drawing Sheets

(51) Int. Cl.
    *G05D 23/19*     (2006.01)
    *G06N 3/08*     (2023.01)
    *G06Q 10/047*     (2023.01)
    *G06Q 10/0631*     (2023.01)
    *G06Q 10/0832*     (2023.01)
    *G06Q 10/0835*     (2023.01)
    *G06N 3/04*     (2023.01)

(52) U.S. Cl.
    CPC ............ *G06N 3/08* (2013.01); *G06Q 10/047* (2013.01); *G06Q 10/06316* (2013.01); *G06Q 10/0832* (2013.01); *G06Q 10/08355* (2013.01); *G05D 2201/0216* (2013.01); *G06N 3/04* (2013.01)

(58) Field of Classification Search
    CPC .. G06N 3/08; G06Q 10/047; G06Q 10/06316; G06Q 10/0832; G06Q 10/08355
    See application file for complete search history.

(56) References Cited

U.S. PATENT DOCUMENTS

2017/0351999 A1* 12/2017 Winkle ............. B65D 81/3895
2019/0340569 A1* 11/2019 Prager ................ G06Q 10/0832

\* cited by examiner

ROBOT AND METHOD OF DELIVERING ARTICLES BY THE ROBOT

CROSS-REFERENCE TO RELATED APPLICATION

Pursuant to 35 U.S.C. § 119(a), this application claims the benefit of an earlier filing date of and the right of priority to Korean Application No. 10-2019-0119126, entitled "ROBOT AND METHOD OF DELIVERING ARTICLES BY THE ROBOT," filed in Korea on Sep. 26, 2019, the contents of which are incorporated by reference herein in their entirety.

BACKGROUND

1. Technical Field

The present disclosure relates to a robot, and more particularly, to a robot for delivering articles to delivery destinations.

2. Description of Related Art

Recently, robots that can be conveniently used in daily life have been actively developed. Such robots are being used to help people in their daily lives in homes, schools and public places.

Services provided by intelligent robots have been increasingly expanding with the active development of intelligent robots. Spaces for robot to provide services are also expanding from small spaces such as homes to large spaces such as airports, and from indoor spaces to outdoor spaces. As activity spaces for robots expand to outdoor spaces, there is also a growing interest in autonomous robots delivering articles on behalf of humans to destinations.

The robots, having a built-in rechargeable battery, are required to move to a charging base or charging station to charge the battery when there is insufficient battery power. When robots deliver articles outdoors, it is very important to efficiently use the battery of the robot and determine an optimal route.

Korea Patent Laid-Open Publication No. 10-2018-0123298 discloses a delivery robot apparatus capable of improving security and convenience by delivering articles, collected in each delivery region by a delivery person, to delivery destinations through a delivery robot apparatus arranged in each delivery region, and a method for operating the robot. In addition, Korea Patent Laid-Open Publication No. 10-2015-0045724 discloses a method for an unmanned delivery service capable of providing safe delivery service by performing mutual authentication between a drone and a transmitter/receiver by using encryption keys. However, the techniques disclosed therein focus on security or safety of a delivery robot system.

There is a need for efficient use of a battery of a robot when an article is delivered. When the robot delivers a plurality of articles, the robot is required to determine an optimal delivery route to minimize battery power consumption.

Further, there is also another need for the robot to appropriately deliver an article according to properties of the article. For example, when the robot delivers an article that is sensitive to temperature change and a traveling environment such as food, the robot is required to preserve the original state of the article as much as possible.

SUMMARY OF THE INVENTION

An aspect of the present disclosure is to provide a means for efficiently using a battery of a robot for delivering articles.

Another aspect of the present disclosure is to provide a means for determining an optimal delivery route.

Another aspect of the present disclosure is to provide a means for enabling the robot to preserve the original state of an article as much as possible when the robot delivers an article that is sensitive to temperature change and a traveling environment such as food.

The present disclosure is not limited to solving the above-described problems, and other aspects and advantages of the present disclosure can be appreciated by those skilled in the art based on the following description and will be understood more clearly from embodiments of the present disclosure. Moreover, aspects and advantages of the present disclosure may be realized by the means and combinations thereof indicated in claims.

In an aspect of the present disclosure, in a robot and method for delivering articles by the robot, a delivery route is determined based on a type of an article loaded in a loading place of the robot, and temperature inside the loading place, in which the article is loaded, is regulated based on temperature of the article while the robot moves along the determined delivery route. The article may be food.

In another aspect of the present disclosure, a robot includes: one or more loading spaces configured to load one or more articles; a travel driver configured to move the robot; an input interface configured to obtain identification information of the one or more articles; a measurer configured to measure temperature of each of the one or more articles; a temperature regulator configured to heat or cool the one or more loading spaces; and a controller configured to determine a type of each of the one or more articles from the identification information, determine a delivery route based on the determined type of the article, and control the temperature regulator based on the measured temperature of each of the one or more articles while controlling the travel driver such that the robot moves along the determined delivery route.

The controller may determine whether the one or more articles loaded in the one or more loading spaces are of the same type; and determine an order in which the one or more articles are delivered based on whether the one or more articles are of the same type.

When the one or more articles are of the same type, the controller may determine the order in which the one or more articles are delivered based on a delivery distance or an estimated delivery time for each of the one or more articles.

When the one or more articles are not of the same type, the controller may determine the order in which the one or more articles are delivered based on an amount of power per unit time or per unit distance required to maintain the temperature of each of the one or more articles within a target range.

The controller may determine candidate routes based on delivery destination information of the one or more articles; for each of the candidate routes, estimate a total amount of power required for delivering all of the one or more articles based on the amount of power per unit time or per unit distance; and determine the order in which the one or more articles are delivered according to a candidate route estimated to require the lowest total amount of power.

The controller may set a target range based on a recommended temperature corresponding to the determined type of the article; compare the measured temperature of each of the one or more articles with the target range; and control the temperature regulator based on a comparison result.

The controller may determine an intensity of the temperature regulator based on a difference between the measured temperature of each of the one or more articles and the target range.

The controller may decrease the intensity of the temperature regulator as the difference between the measured temperature of each of the one or more articles and the target range decreases.

When the measured temperature of each of the one or more articles is within the target range, the controller may turn off the temperature regulator.

The controller may regulate the intensity of the temperature regulator according to a temperature regulation profile corresponding to the determined type of the article.

The temperature regulation profile may be set to decrease the intensity of the temperature regulator continuously or discontinuously according to progress of delivery.

The temperature regulation profile may be set to turn off the temperature regulator when a remaining delivery distance for each of the one or more articles decreases to below a first threshold value or a remaining delivery time for each of the one or more articles decreases to below a second threshold value.

The temperature regulation profile may be set to increase the intensity of the temperature regulator continuously or discontinuously according to the progress of delivery.

The measurer may further be configured to measure an outdoor temperature, and the controller may regulate the intensity of the temperature regulator based on the measured outdoor temperature.

In another aspect of the present disclosure, a method for delivering articles by a robot includes: obtaining identification information of one or more articles loaded in one or more loading spaces of the robot; measuring temperature of each of the one or more articles; determining a type of each of the one or more articles from the identification information; determining a delivery route based on the determined type of the article; and heating or cooling the one or more loading spaces in which the one or more articles are loaded, based on the measured temperature of each of the one or more articles, while moving along the determined delivery route.

The determining of the delivery route may include: determining whether the one or more articles loaded in the one or more loading spaces are of the same type; when the one or more articles are of the same type, determining an order in which the one or more articles are delivered based on a delivery distance or an estimated delivery time for each of the one or more articles; and when the one or more articles are not of the same type, determining an order in which the one or more articles are delivered based on an amount of power per unit time or per unit distance required to maintain the temperature of each of the one or more articles within a target range.

The regulating of the temperature inside each of the one or more loading spaces in which each of the one or more articles is loaded may include: setting a target range based on a recommended temperature corresponding to the determined type of the article; and regulating an intensity of the heating or cooling based on a difference between the measured temperature of each of the one or more articles and the set target range.

The regulating of the intensity of the heating or cooling may include decreasing an intensity of a temperature regulator as the difference between the measured temperature of each of the one or more articles and the target range decreases.

The regulating of the intensity of the heating or cooling may include at least one of: regulating the intensity of the heating or cooling according to a temperature regulation profile corresponding to the determined type of the article; or regulating the intensity of the heating or cooling based on an outdoor temperature.

The identification information may include at least one of an image, voice, or text indicating each of the one or more articles. The determining of the type of the article may include determining the type of the article by inputting the identification information to a learning model which is based on an artificial neural network, and the artificial neural network may be trained to output the type of the article corresponding to the image, the voice, or the text indicating each of the one or more articles.

According to an aspect of the present disclosure, it is possible to improve battery efficiency of the robot for delivering articles.

According to another aspect of the present disclosure, it is possible to determine an optimal delivery route for delivering a plurality of articles.

According to another aspect of the present disclosure, it is possible to enable the robot to preserve an original state of an article that is sensitive to temperature change and a traveling environment, such as food, as much as possible.

Effects of the present disclosure are not limited to the above-mentioned effects, and other effects, not mentioned above, will be clearly understood by those skilled in the art from the description of claims.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
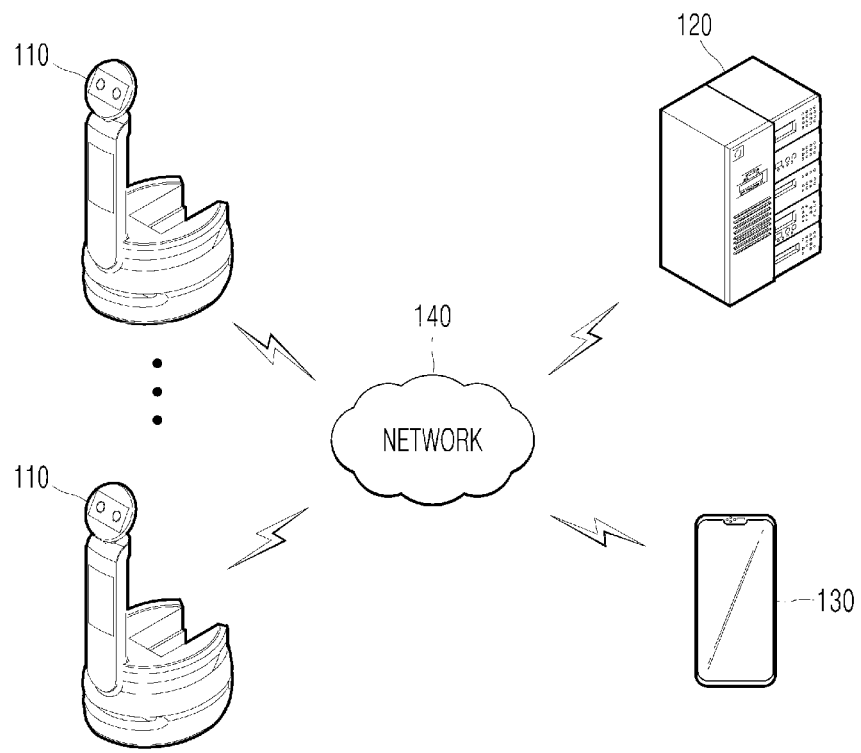
FIG. 1 is a diagram illustrating a robot system according to an embodiment of the present disclosure.

In what follows, embodiments disclosed in this document will be described in detail with reference to appended drawings, where the same or similar constituent elements are given the same reference number irrespective of their drawing symbols, and repeated descriptions thereof will be omitted. In the following description, the terms "module" and "unit" for referring to elements are assigned and used exchangeably in consideration of convenience of explanation, and thus, the terms per se do not necessarily have different meanings or functions. Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present disclosure; rather, it should be understood that the appended drawings include all of the modifications, equivalents or substitutes described by the technical principles and belonging to the technical scope of the present disclosure.

It will be understood that, although the terms "first", "second", and the like may be used herein to describe various elements, these elements should not be limited by these terms. These terms are generally used only to distinguish one element from another.

Similarly, it will be understood that when an element is referred to as being "connected," "attached," or "coupled" to another element, it can be directly connected, attached, or coupled to the other element, or intervening elements may be present. In contrast, when an element is referred to as being "directly on," "directly engaged to," "directly connected to," or "directly coupled to" another element or layer, there may be no intervening elements or layers present.

A robot may refer to a machine which automatically handles a given task by its own ability, or which operates autonomously. In particular, a robot having a function of recognizing an environment and performing an operation according to its own judgment may be referred to as an intelligent robot.

Robots may be classified into industrial, medical, household, and military robots, according to the purpose or field of use.

A robot may include an actuator or a driving unit including a motor in order to perform various physical operations, such as moving joints of the robot. Moreover, a movable robot may include, for example, a wheel, a brake, and a propeller in the driving unit thereof, and through the driving unit may thus be capable of traveling on the ground or flying in the air.

Autonomous driving is a self-driving technology, and an autonomous vehicle is a vehicle that moves without any manipulation by a user or with minimum manipulation by a user.

For example, autonomous driving may include all of a technology for keeping a driving lane, a technology for automatically controlling a speed such the an adaptive cruise control, a technology for automatically driving a vehicle along a determined path, and a technology for, if a destination is set, automatically setting a path and driving a vehicle along the path.

A vehicle includes a vehicle having only an internal combustion engine, a hybrid vehicle having both an internal combustion engine and an electric motor, and an electric vehicle having only an electric motor, and may include not only an automobile but also a train and a motorcycle.

In this case, an autonomous vehicle may be considered as a robot with an autonomous driving function.

FIG. 1 is a diagram illustrating a robot system according to an embodiment of the present disclosure. Referring to FIG. 1, a robot system according to an embodiment of the present disclosure may include one or more robots 110 and a control server 120, and may optionally further include a terminal 130.

The one or more robots 110, the control server 120, and the terminal 130 may be connected to each other through a network 140. The one or more robots 110, the control server 120, and the terminal 130 may communicate with each other through a base station, but may also directly communicate with each other without going through a base station.

The one or more robots 110 may perform a task in a space and provide information or data related to the task for the control server 120. A workspace of a robot may be indoors or outdoors. A robot may be operated in a predefined space by a wall or a column. In this case, a workspace of a robot may be defined in various ways depending on the design purpose, working attributes of the robot, mobility of the robot, and other factors. A robot may be operated in an open space, which is not predefined. The robot may also sense a surrounding environment and determine a workspace by itself.

The one or more robots 110 may provide its state information or data for the control server 120. The state information of the robot 110 may include, for example, information about the robot 110 regarding a position, a battery level, durability of parts, and replacement cycles of consumables.

The control server 120 may perform various analysis based on information or data provided by the one or more robots 110, and control an overall operation of a robot system based on the analysis result. In an aspect, the control server 120 may directly control driving of the robot 110 based on the analysis result. In another aspect, the control server 120 may derive and output useful information or data from the analysis result. In still another aspect, the control server 120 may adjust parameters in a robot system using the derived information or data. The control server 120 may be implemented as a single server, but may be implemented as a plurality of server sets, a cloud server, or a combination thereof.

The terminal 130 may share the role of the control server 120. In an aspect, the terminal 130 may obtain information or data from the one or more robots 110 and provide the information or data for the control server 120, or may obtain information or data from the control server 120 and provide the information or data for the one or more robots 110. In another aspect, the terminal 130 may share at least a portion of analysis to be performed by the control server 120, and may provide a result of the analysis for the control server 120. In still another aspect, the terminal 130 may receive an analysis result, information, or data from the control server 120, and may simply output the analysis result, information, or data.

The terminal 130 may share the role of the control server 120. At least one robot of a plurality of robots 110 may replace the control server 120. In this case, the plurality of robots 110 may be connected to communicate with each other.

The terminal 130 may include various electronic devices capable of communicating with the robot 110 and the control server 120. The terminal 130 may be implemented as a stationary terminal and a mobile terminal, such as a mobile phone, a projector, a mobile phone, a smartphone, a laptop computer, a terminal for digital broadcast, a personal digital assistant (PDA), a portable multimedia player (PMP), a navigation system, a slate PC, a tablet PC, an ultrabook, a wearable device (for example, a smartwatch, a smart glass, and a head mounted display (HMD)), a set-top box (STB), a digital multimedia broadcast (DMB) receiver, a radio, a laundry machine, a refrigerator, a desktop computer, and digital signage.

The network 140 may refer to a network which configures a portion of a cloud computing infrastructure or which is provided in a cloud computing infrastructure. The network 140 may be, for example, a wired network such as local area networks (LANs), wide area networks (WANs), metropolitan area networks (MANs), or integrated service digital networks (ISDNs), or a wireless communications network such as wireless LANs, code division multiple access (CDMA), wideband CDMA (WCDMA), long term evolution (LTE), long term evolution-advanced (LTE-A), 5G (generation) communications, Bluetooth™, or satellite communications, but is not limited thereto.

The network 140 may include connection of network elements such as hubs, bridges, routers, switches, and gateways. The network 140 may include one or more connected networks, for example, a multi-network environment, including a public network such as an Internet and a private network such as a safe corporate private network. Access to the network 140 may be provided through one or more wire-based or wireless access networks. Further, the network 140 may support various types of machine-to-machine (M2M) communications (for example, Internet of Things (IoT), Internet of Everything (IoE), Internet of Small Things (IoST)), transmitting and receiving information between distributed components such things to process the information, and/or 5G communications.

The robot 110 needs to move to a charging base or charging station to charge a battery when battery power is insufficient. When the robot 110 delivers articles outdoors, it is important to efficiently use the battery and determine an optimal route. Further, when the robot 110 delivers an article that is sensitive to temperature change and a traveling environment, such as food, it is important to preserve the original state of the article as much as possible.

Embodiments of the present disclosure are to provide means to determine an optimal delivery route for effectively using the battery of the robot 110. In addition, embodiments of the present disclosure are to provide means for enabling the robot 110 delivering an article that is sensitive to temperature change or a traveling environment to preserve the original state of the article as much as possible.

Figure 2:
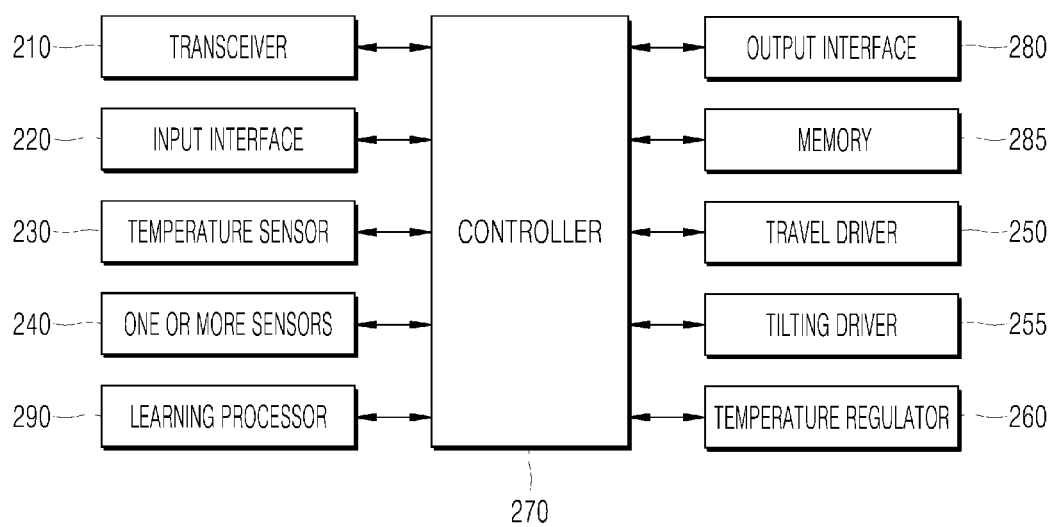
FIG. 2 is a block diagram illustrating a configuration of a robot according to an embodiment of the present disclosure.
Figure 3:
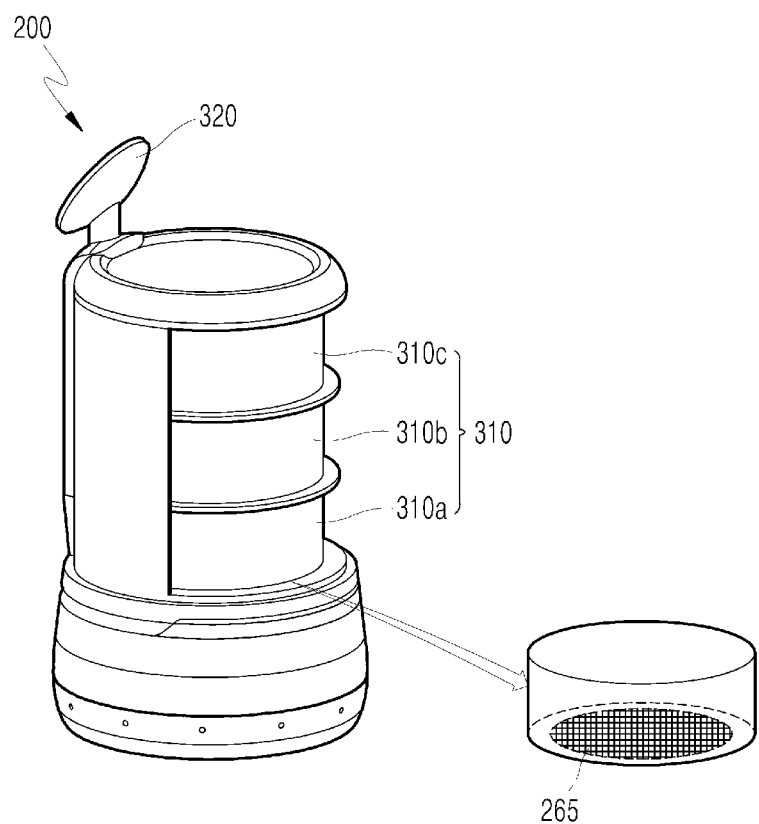
FIG. 3 is a diagram illustrating a robot according to an embodiment of the present disclosure.

FIG. 2 is a block diagram illustrating a configuration of a robot according to an embodiment of the present disclosure, and FIG. 3 is a diagram illustrating a robot according to an embodiment of the present disclosure.

Referring to FIG. 2, a robot 200 according to an embodiment of the present disclosure may include a transceiver 210, an input interface 220, a measurer 230, a sensor 240, a travel driver 250, a temperature regulator 260, a controller 270, an output interface 280, and a memory 285. The robot 200 may optionally further include a tilting driver 255. The robot 200 may further include a learning processor 290 to perform operations related to artificial intelligence and/or machine learning.

Referring to FIG. 3, a robot 200 according to an embodiment of present disclosure may include one or more loading spaces 310.

In the present disclosure, the loading spaces refer to spaces in which articles can be loaded. The loading spaces may include various types of spaces for distinguishing one article group from another article group. The loading spaces may be sealed or closed spaces, or at least partially opened spaces. That is, the loading spaces may include spaces divided only by, for example, partitions. The article group may refer to one article or a set of articles delivered to a particular customer. FIG. 3 shows three loading spaces 310*a*, 310*b*, and 310*c* that are implemented in the form of a drawer that is movable in a horizontal direction. However, the forms and/or structures of the loading spaces are not limited thereto.

In some embodiments, the loading space may include a stand (not shown) for an article to be placed thereon. The stand may be implemented as a bottom surface of the loading space, but may also be implemented as a separate structure attached to the bottom surface of the loading space.

In an embodiment, the stand of the loading space may be configured to tilt. The robot 200 may further include a tilting driver 255 for tilting the stand of the loading space.

The transceiver 210 may transmit and receive information or data with external devices such as the control server 120, or the terminal 130 using wired or wireless communication technology. For example, the transceiver 210 may transmit or receive sensor data, user input, a learning model, a control signal, and the like with the external devices.

The transceiver 210 may use communication technology such as global system for mobile communication (GSM), code division multi access (CDMA), CDMA2000, enhanced voice-data optimized or enhanced voice-data only (EV-DO), wideband CDMA (WCDMA), high speed downlink packet access (HSDPA), high speed uplink packet access (HSUPA), long term evolution (LTE), LTE-advanced (LTE-A), wireless LAN (WLAN), wireless-fidelity (Wi-Fi), Bluetooth™, radio frequency identification (RFID), infrared data association (IrDA), ZigBee, near field communication (NFC), visible light communication, and light-fidelity (Li-Fi).

The transceiver 210 may use a 5G communication network. The transceiver 210 may communicate with external devices such as the control server 120 and the terminal 130 by using at least one service of enhanced mobile broadband (eMBB), ultra-reliable and low latency communication (URLLC), or massive machine-type communication (mMTC).

The enhanced mobile broadband (eMBB) is a mobile broadband service. The eMBB provides multimedia content, wireless data access, and the like. Further, the eMBB may also provide enhanced mobile services such as a hot spot and a broadband coverage to cover the mobile traffic which is explosively increased. A large quantity of traffics may be accommodated in a region with less user mobility and higher density through the hot spot. Through broadband coverage, a wide-range and stable wireless environment and user mobility may be guaranteed.

The ultra-reliable and low latency communication (URLLC) service defines much stricter requirements than the existing LTE services in terms of reliability of data transmission and reception and transmission delay. Based on such a service, 5G services may be provided for, for example, production process automation at industrial sites, telemedicine, telesurgery, transportation, and safety.

The massive machine-type communication (mMTC) is a service which is insensitive to the transmission delay which requires transmission of a comparatively small amount of data. The mMTC allows a much larger number of terminals to access a wireless access network simultaneously than before.

The transceiver 210 may receive map information from the control server 120, the terminal 130, or another robot. The map information may include information about, for example, a state of a road surface or an angle of inclination of the road surface. The transceiver 210 may provide the received map information to the controller 270. The map information may be used to determine a delivery route and/or control traveling of the robot 200. The map information may be stored in the memory 285.

There may be no limitation in the range of the region where the robot 200 is capable of delivering articles. However, the delivery range of the robot 200 may be limited to a certain region according to, for example, a battery capacity of the robot 200 and efficiency of the delivery service. In an embodiment, the map information may include map information of all regions covering the delivery range of the robot 200. In another embodiment, the map information may include map information of only a region that is close to the current location of the robot 200.

In an embodiment, the transceiver 210 may receive map information at predetermined intervals. In another embodiment, the transceiver 210 may receive map information when requested from the controller 270.

In an embodiment, the transceiver 210 may receive article reference information from the control server 120, the terminal 130, or another robot. The article reference information may include reference information for determining a type of an article and various reference information corresponding to the type of the article. For example, the article reference information may include an image, voice, or text corresponding to the type of the article, a recommended temperature or a temperature regulation profile corresponding to the type of the article, and information about an amount of power per unit time corresponding to the type of the article. The transceiver 210 may provide the received article reference information for the controller 270. The article reference information may be used to determine a delivery route and/or a temperature regulation level. The article reference information may be stored in the memory 285.

In an embodiment, the transceiver 210 may receive identification information and delivery destination information of the article from a terminal 130 of a deliverer. The transceiver 210 may provide the received identification information and delivery destination information of the article for the controller 270.

The input interface 220 may obtain various types of data. The input interface 220 may include, for example, at least one camera for obtaining an image signal including a still image or a video image, a microphone for obtaining an audio signal, and a user interface for receiving information from a user. Components of the input interface 220 may be disposed at various locations in consideration of convenience of a deliverer or a recipient. For example, as illustrated in FIG. 3, the input interface 220 may be disposed in a head 320 of the robot 200.

In an embodiment, the input interface 220 may obtain the identification information and the delivery destination information of the article from the deliverer. The input interface 220 may provide the obtained identification information and delivery destination information of the article for the controller 270.

The identification information of the article indicates basic information for identifying a type of the article. The identification information of the article may include an image, voice, text, or any combination thereof indicating the article. For example, when the type of the article is Cafe Americano, the identification information of the article may include, for example a captured image of a cup containing Americano coffee, a voice of a deliverer who has uttered "Americano", and a text of "Americano" inputted into a user interface. The image indicating the article may be obtained by a camera, the voice indicating the article may be obtained by a microphone, and the text indicating the article may be obtained by a user interface. The delivery destination information of the article indicates a destination to which the article is to be delivered. The delivery destination information may include information such as a global positioning system (GPS) coordinate and an address indicating the destination.

In another embodiment, the input interface 220 may receive the type of the article directly from the deliverer. That is, the identification information of the article obtained by the input interface 220 may include information about the type of the article. In this case, the input interface 220 may provide a guide interface for receiving the type of the article directly from the deliverer.

The input interface 220 may obtain input data to be used when obtaining an output utilizing learning data and a training model for training an artificial neural network. The input interface 220 may obtain raw input data. In this case, the controller 270 or the learning processor 290 may extract an input feature by preprocessing the input data.

In an embodiment, the image, voice, and text indicating the article may be used as learning data for training an artificial neural network. The artificial neural network may be trained to output the type of the article corresponding to the image, voice, and text indicating the article.

The measurer 230 measures temperature of an article or temperatures of the inside of loading spaces. The measurer 230 may provide the measured temperature of the article or the measured temperatures of the inside of the loading spaces for the controller 270.

The measurer 230 may be disposed in each of the loading spaces. As illustrated in FIG. 3, the measurer 230 may be disposed in the head 320 of the robot 200 as well as in the loading spaces. The measurer 230 disposed in the head 320 may measure temperature of an article before loaded.

The measurer 230 may include various types of temperature sensors capable of measuring temperature in a contacting or non-contacting manner. As an example, the measurer 230 may include an infrared temperature sensor capable of measuring temperature of an article or temperature inside a loading space in a non-contacting manner. The infrared temperature sensor may be placed at a position where an infrared signal emitted from itself is directed to the article.

In another embodiment, the measurer 230 may measure an outdoor temperature. The measurer 230 may be installed on the outer surface of the robot 200 to measure an outdoor temperature.

The sensor 240 may acquire at least one among internal information of the robot 200, surrounding environment information, or user information by using various sensors. The sensor 240 may include an acceleration sensor, a magnetic sensor, a gyroscope sensor, an inertial sensor, a proximity sensor, an RGB sensor, an illumination sensor, a humidity sensor, a fingerprint recognition sensor, an ultrasonic sensor, an optical sensor, a microphone, a light detection and ranging (lidar) sensor, radar, or any combination thereof. Sensor data obtained by the sensor 240 may be used for autonomous driving of the robot 200.

The travel driver 250 physically drives the robot 200. The travel driver 250 may include an actuator or a motor operating according to a control signal from the controller 270. The travel driver 250 may include, for example, a wheel, a brake, and a propeller operated by the actuator or motor.

The tilting driver 255 tilts the stands of the loading spaces according to a control signal from the controller 270. The tilting driver 255 may tilt the stands of the loading spaces by using various methods known to those skilled in the art. The tilting driver 255 may include an actuator or a motor for operating the stands.

The temperature regulator 260 heats or cools the loading spaces according to a control signal from the controller 270. The temperature regulator 260 may include a heater for heating the loading spaces and a cooler for cooling the loading spaces. The heater may include various types of devices capable of providing heat inside the loading space, such as a heating wire, an induction, and a radiator. The cooler may include various types of devices capable of cooling the inside of the loading space, such as a heat dissipation plate, a fan, and a thermoelectric cooling device. FIG. 3 shows a heat wire 265 disposed on the bottom of the loading space.

The temperature regulator 260 may be disposed in each of the loading spaces. In an embodiment, both a heater and a cooler may be installed in each of the loading spaces. In another embodiment, the loading spaces may be classified as loading spaces each having only a heater installed therein and loading spaces each having only a cooler installed therein.

The strength or intensity of the heater or the cooler for the temperature regulator 260 may be regulated according to a control signal from the controller 270. In an embodiment, a temperature regulation level may be defined to indicate the strength or intensity of the heater or the cooler for the temperature regulator 260. A higher temperature regulation level may refer to a stronger intensity of the heater or the cooler. Various parameters regarding the temperature regulation level may be variously defined according to, for example, specifications of the heating device or the cooling device and specifications of the battery of the robot 200.

The output interface 280 may generate a visual, auditory, or tactile related output. The output interface 280 may include a display unit outputting visual information, a speaker outputting auditory information, and a haptic module outputting tactile information. At least some components of the output interface 280 may be disposed in the head 320 of the robot 200 together with the input interface 220.

The memory 285 may store data supporting various functions of the robot 200. The memory 285 may store information or data received by the transceiver 210, and input information, input data, learning data, a learning model, and a learning history obtained by the input interface 220.

In an embodiment, the memory 285 may store, for example, the identification information and the delivery destination information of the article received from the transceiver 210 or the input interface 220, the map information and the article reference information received from the transceiver 210. The map information and the article reference information may be collected in advance from, for example, the control server 120 and stored in the memory 285, and may be periodically updated.

The controller 270 may determine at least one executable operation of the robot 200 based on information determined or generated by using a data analysis algorithm or a machine learning algorithm. In addition, the controller 270 may control components of the robot 200 to perform the determined operation.

The controller 270 may request, retrieve, receive, or use information or data of the learning processor 290 or the memory 285, and may control components of the robot 200 to execute a predicted operation or an operation determined to be preferable of the at least one executable operation. When connection with an external device such as the control server 120 and the terminal 130 is necessary to perform the determined operation, the controller 270 may generate a control signal to control the corresponding external device, and may transmit the generated control signal to the corresponding external device.

The controller 270 may control at least some of components of the robot 200 to drive an application stored in the memory 285. Furthermore, the controller 270 may operate two or more components included in the robot 200 in combination with each other to drive the application.

The controller 270 may include, for example, one or more of a mobile processor, an application processor (AP), a microprocessor, a central processing unit (CPU), and a graphic processing unit (GPU), a neural processing unit (NPU), a processor core, a multiprocessor, an application-specific integrated circuit (ASIC), or a field programmable gate array (FPGA), but is not limited thereto.

The controller 270 may control the travel driver 250 based on sensor data received from the sensor 240 for autonomous driving. The controller 270 may control the travel driver 250 in various ways known to those skilled in the art to allow the robot 200 to autonomously travel to a delivery destination.

The controller 270 may determine a type of the article loaded in the loading space, determine a delivery route based at least on the determined type of the article, and regulate temperature inside the loading space in which the article is loaded while moving along the determined delivery route. Hereinafter, operations performed by the controller 270 will be described in detail.

Determination of Type of Article

The controller 270 may determine a type of an article from the identification information of the article received from the input interface 220 or the transceiver 210. The type of an article may refer to a category of an article indicating articles that have the same or similar characteristics. The type of an article may be defined in various ways depending on, for example, a main delivery article and a design purpose of the robot 200. As an example, when the identification information of an article includes a captured image of a cup containing Americano coffee, the voice of a deliverer uttering "Americano," or an inputted text of "Americano," the controller 270 may determine the type of the article as "Cafe Americano." However, the controller 270 may determine the type of the article as a broader category such as "hot coffee" or "hot beverage."

As described above, the input interface 220 may receive the type of an article directly from the deliverer. That is, the identification information of the article obtained from the input interface 220 may include information about the type of the article. The controller 270 may provide a guide interface for receiving the type of the article directly from the deliverer through the input interface 220 and the output interface 280. The controller 270 may display guide information on a display for the output interface 280 or output the guide information through a speaker. The deliverer may select or input the type of the article through the microphone or the user interface for the input interface 210 according to the outputted guide information. The controller 270 may check whether the type of the article received from the input interface 220 is suitable and may make an appropriate correction as required.

Determination of Delivery Route

Figure 4:
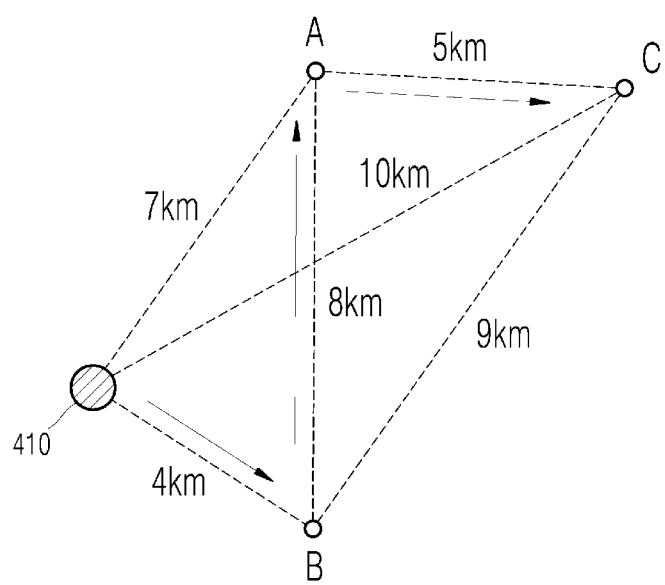
FIGS. 4 and 5 are diagrams for explaining a determination of a delivery route by a robot according to an embodiment of the present disclosure.
Figure 5:
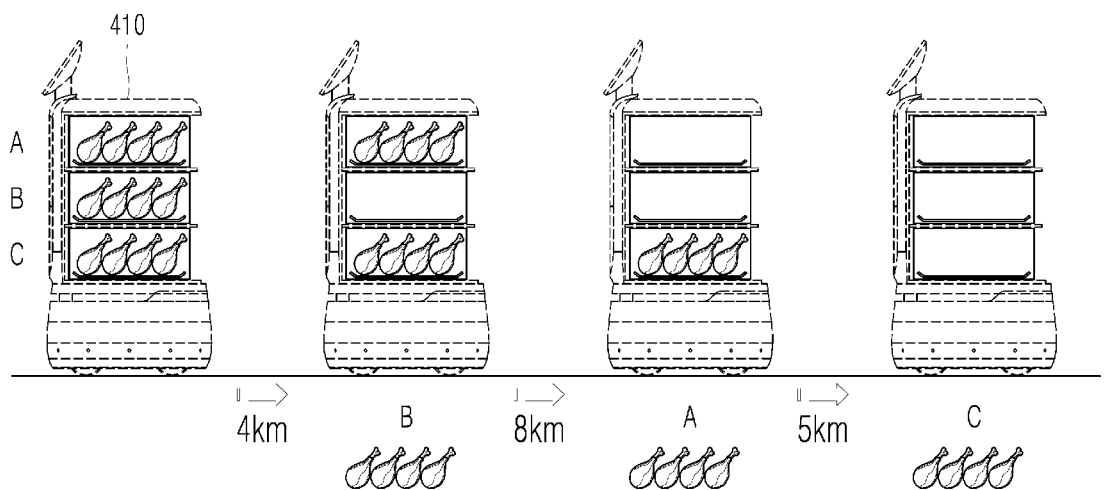
Figure 6:
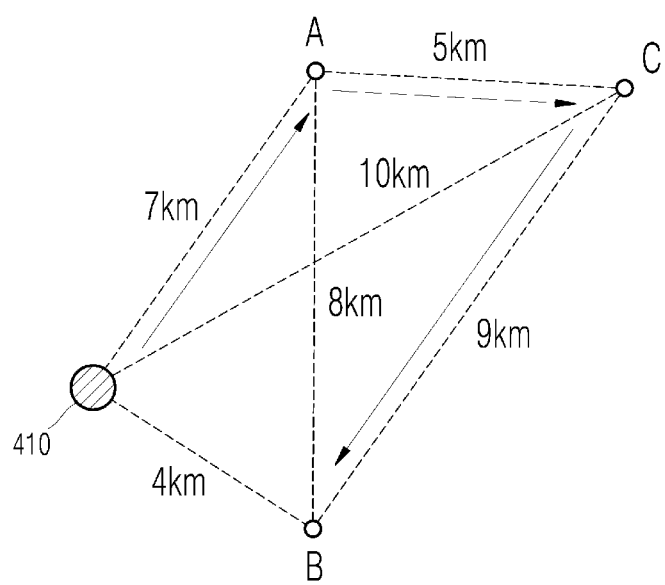
FIGS. 6 and 7 are diagrams for explaining a determination of a delivery route by a robot according to another embodiment of the present disclosure.
Figure 7:
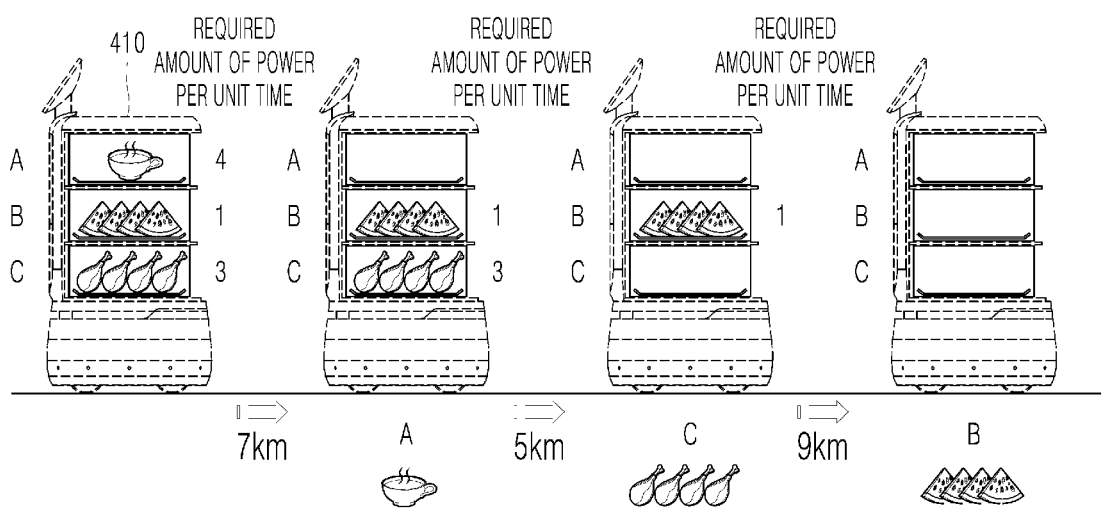

FIGS. 4 and 5 are diagrams for explaining determination of a delivery route by a robot according to an embodiment of the present disclosure. FIGS. 6 and 7 are diagrams for explaining determination of a delivery route by a robot according to another embodiment of the present disclosure.

The controller 270 may determine a delivery route based on the determined or inputted type of an article. The controller 270 may refer to the map information stored in the memory 285 to determine a delivery route. The controller 270 may determine, for example, the shortest route to a delivery destination, alternative routes, and an estimated arrival time by using various methods known to those skilled in the art. In the present disclosure, the determination of the delivery route may have several aspects depending on the number of articles and whether the articles are of the same type.

In an aspect, only one article is loaded in the loading space. For example, an article may be loaded in only one of the loading spaces 310a, 310b, and 310c of FIG. 3. The controller 270 may determine a delivery route based on the type of the article. In an embodiment, the controller 270 may determine a delivery route that is most suitable for the type of the article among candidate routes to the delivery destination. As an example, when the article contains a liquid, such as a soup or a stew, the preferred route may be a route that enables traveling at a constant speed with little shaking. The controller 270 may determine a route with a less amount of turns (for example, a straight route) or a route with good road surface conditions (such as a paved wide road) as a delivery route for the article.

In other aspects, two or more articles are loaded in the loading spaces. For example, articles may be loaded in all of the loading spaces 310a, 310b, and 310c of FIG. 3. The controller 270 may determine whether the articles loaded in the loading spaces are of the same type.

In an embodiment, when the articles are of the same type, the controller 270 may determine an order in which the articles are delivered based on delivery distances or estimated delivery times for the articles. The delivery distance may refer to a distance to a delivery destination, and the estimated delivery time may refer to an estimated time required to arrive at the delivery destination. When the articles are of the same type, an amount of power required to maintain temperature for each of the articles may be substantially the same as temperatures for the other articles. Therefore, it may be favorable for battery efficiency to reduce the number of articles in the loading spaces as quickly as possible and to reduce the total weight of the articles.

Referring to FIGS. 4 and 5, it is assumed that a plurality of fried chicken is loaded in the loading spaces of a robot 410, and the plurality of fried chicken should be delivered to each delivery destination A, B, and C. FIG. 4 illustrates the location of the robot 410 and the locations of the delivery destinations A, B, and C.

The controller 270 may determine delivery distances or estimated delivery times with reference to the locations of the delivery destinations A, B, and C. As illustrated in FIG. 4, the controller 270 may determine not only a delivery distance or an estimated delivery time from the location of the robot 410 to each of the delivery destinations A, B, and C, but also delivery distances or estimated delivery times between each of the delivery destinations A, B, and C.

The controller 270 may determine an order in which the plurality of fried chicken is delivered such that the fried chicken with a shorter delivery distance or a shorter estimated delivery time is delivered first. For example, as illustrated in FIG. 4, the order of delivery may be determined as the following order: delivery destination B, which is closest to the location of the robot 410; delivery destination A, which is closest to the delivery destination B; and delivery destination C (that is, B-A-C). The order of delivery based on the estimated delivery time may also be determined in the same manner.

In another embodiment, when articles are not of the same type, the controller 270 may determine an amount of power required to maintain temperature of each of the articles, and determine an order in which the articles are delivered based on the determined amount of power. When the articles are not of the same type, an amount of power required to maintain the temperature of each of the articles will also be different. Therefore, it may be more favorable for battery efficiency to deliver an article requiring a larger amount of power to maintain temperature thereof earlier.

Referring to FIGS. 6 and 7, it is assumed that a cup of hot coffee, a watermelon, and fried chicken are loaded in the respective loading spaces of the robot 410, and the cup of hot coffee is to be delivered to delivery destination A, the watermelon is to be delivered to delivery destination B, and the fried chicken is to be delivered to delivery destination C. FIG. 6 illustrates the location of the robot 410 and the locations of the delivery destinations A, B, and C.

In an embodiment, the controller 270 may determine an amount of power required to maintain temperature of each article within a target range. The amount of power may be an amount of power per unit time or an amount of power per unit distance. The amount of power per unit time may refer to an amount of power generally required to maintain the temperature of the corresponding article, for example, for one minute or for one hour. The amount of power per unit distance may refer to an amount of power generally required to travel a distance of, for example, one meter or one kilometer while maintaining the temperature of the corresponding article. The amount of power per unit time and the amount of power per unit distance may be interchangeable based on the moving speed of the robot 200. The amount of power per unit time and the amount of power per unit distance may be expressed as an absolute value but may also be expressed as a relative level.

The controller 270 may refer to article reference information stored in the memory 285 to determine an amount of power per unit time or per unit distance corresponding to the type of an article. As described above, the article reference information may include the amount of power per unit time or per unit distance corresponding to the type of the article and a recommended temperature corresponding to the type of the article. As illustrated in FIG. 7, the controller 270 may determine a level of power per unit time required for the "Cafe Americano" or "hot coffee" as "4," a level of power per unit time required for the "watermelon" as "1," and a level of power per unit time required for the "fried chicken" as "3."

The controller 270 may determine an order in which the articles are delivered with reference to the amount of power per unit time required for each article and the location of each delivery destination. In an embodiment, the controller 270 may estimate a total amount of power required to deliver all of the articles for each candidate route. The controller 270 may determine the order in which the articles are delivered according to a candidate route estimated to require the lowest total amount of power.

In an embodiment, the controller 270 may estimate the total amount of power required for each of the candidate routes based on a combination of the amount of power per unit time or per unit distance, and the delivery distance or the expected arrival time for each of the articles. For example, in FIG. 6, the delivery route may be determined as one of a first route (A-B-C), a second route (A-C-B), a third route (B-A-C), a fourth route (B-C-A), a fifth route (C-A-B), or a sixth route (C-B-A). A level of total power required for each candidate route may be estimated.

Referring to FIG. 7, when the second route (A-C-B) is determined for delivery, the robot 410 needs to move a distance of "7 kilometers" to delivery destination A while consuming power at a level of per unit time of "8," move to a distance of "5 km" to delivery destination C while consuming power at a level of per unit time of "4," and move a distance of "9 km" to delivery destination B while consuming power at a level of per unit time of "1." Therefore, the level of total power required for the second route (A-C-B) may be estimated to be "85" based on the calculation of (8×7)+(4×5)+(1×9). In a similar manner, the levels of total power required for the other routes may be estimated as follows:

(8×7)+(4×8)+(3×9)=115    First route (A-B-C):

(8×4)+(7×8)+(3×5)=103    Third route (B-A-C):

(8×4)+(7×9)+(4×5)=115    Fourth route (B-C-A):

(8×10)+(5×5)+(1×9)=114    Fifth route (C-A-B):

(8×10)+(5×9)+(4×8)=157    Sixth route (C-B-A):

The controller 270 may determine the second route (A-C-B), which is expected to minimize the total required amount of power, to be a delivery route.

Regulation of Temperature Inside Loading Space

The controller 270 may control the temperature regulator 260 while controlling the travel driver 250 to travel along the determined delivery route. The regulation of the temperature inside the loading space may have different aspects, depending on whether the control is focused on preserving the state of the article or focused on battery efficiency.

In one aspect, in order to maintain temperature of an article measured by the measurer 230 within a target range, the controller 270 may regulate temperature inside the loading space in which the article is loaded. In this aspect, the controller 270 may focus on preserving the state of the article.

The target range may refer to a temperature range in which the article can be preserved in an optimal state. The target range may vary depending on the type of the article. Table 1 shows the recommended temperatures for several foods. As described above, the recommended temperature corresponding to the type of the article may be stored in the memory 285 as article reference information.

TABLE 1

| Food | Recommended temperature (° C.) | Food | Recommended temperature (° C.) |
| --- | --- | --- | --- |
| Stew | 95 | Cold water | 8 to 12 |
| Steamed sweet potato | 90 or Room temperature | Cold milk | 10 to 15 |
| Coffee | 65 to 73 | Sweet jelly of red beans | 10 to 12 |
| Udon | 58 to 70 | Watermelon | 11 |
| Miso soup | 60 to 68 | Bavarian cream | 10 |
| Fried Chicken | 64 to 65 | Juice | 8 to 10 |
| Soup | 60 to 65 | Beer | 7 to 10 |
| Sweet red-bean porridge | 60 to 65 | Iced coffee | 6 |

TABLE 1-continued

| Food | Recommended temperature (° C.) | Food | Recommended temperature (° C.) |
| --- | --- | --- | --- |
| Milk | 58 to 64 | Lemon-lime soft drink | 1 to 5 |
| Black tea | 60 | Ice cream | −6 |
| Refined rice wine | 50 to 60 | | |

The controller 270 may set a target range with reference to the recommended temperature corresponding to the determined type of an article. In an embodiment, when the recommended temperature is of a relatively wide temperature range, the controller 270 may set such a wide temperature range as the target range. As an example, the target range for "udon" may be set as 58 to 70° C., which is the same as the recommended temperature. When the recommended temperature is only a single temperature or is of a relatively narrow temperature range, the controller 270 may expand the recommended temperature to set a target range. As an example, the target range for "watermelon" may be set as 8 to 14° C., which is a range of ±3° C. from the recommended temperature of 11° C. The target range for "juice" may be set as 6 to 12° C. based on the recommended temperature of 8 to 10° C. The extent to which the target range is set may be variously selected according to the design purpose or the type of an article.

The controller 270 may compare the temperature of the article measured by the measurer 230 with the target range set for the corresponding article and control the temperature regulator 260 based on the comparison result.

When the measured temperature of the article is within the target range, the controller 270 may control the temperature regulator 260 to maintain the temperature of the article. In an embodiment, the controller 270 may turn off the temperature regulator 260 when the measured temperature of the article is within the target range.

When the measured temperature of the article is not within the target range, the controller 270 may control the temperature regulator 260 based on a difference between the temperature of the article and the target range. The difference between the temperature of the article and the target range may be a difference between the temperature of the article and the upper or lower limit of the target range, or a difference between the temperature of the article and the middle value of the target range.

The controller 270 may increase an intensity of the temperature regulator 260 as the difference between the measured temperature of the article and the target range increases, and decrease the intensity of the temperature regulator 260 as the difference decreases. The increase or decrease in the intensity of the temperature regulator 260 may be continuous or discontinuous. In an embodiment, the controller 270 may determine a temperature regulation level corresponding to the difference between the temperature of the article and the target range, and control the temperature regulator 260 according to the determined temperature regulation level. As the difference between the temperature of the article and the target range increases, the temperature regulation level may be increased. As the difference between the temperature of the article and the target range decreases, the temperature regulation level may be decreased.

In another aspect, the controller 270 may regulate the intensity of the temperature regulator 260 according to a temperature regulation profile corresponding to the determined type of the article. The temperature regulation profile may be a guideline for controlling the intensity of the temperature regulator 260. The temperature regulation profile may include control information with respect to a change in the intensity of the temperature regulator 260 as the delivery progresses, which is set for optimal battery efficiency. The temperature regulation profile may be set to be commonly applicable to all articles, or set to be applicable to a specific article or a specific group of articles. The temperature regulation profile may be stored in the memory 285 as article reference information.

Depending on the type of article, the rate at which the article cools down or heats up may vary. The rate at which the article cools down or heats up may be affected by, for example, viscosity and specific heat of the article. For example, coffee has less viscosity than porridge, and accordingly, cools down relatively quickly. For each article, it may be desirable that an optimal control pattern of the temperature regulator 260 is set in advance.

The temperature regulation profile may be set in various aspects. In an embodiment, the temperature regulation profile may be set such that the intensity of the temperature regulator 260 is continuously or discontinuously decreased according to progress of delivery. That is, as the delivery destination becomes closer, the smaller the intensity of the temperature regulator 260 becomes. In another embodiment, the temperature regulation profile may be set such that the intensity of the temperature regulator 260 is continuously or discontinuously increased according to progress of delivery. That is, as the delivery destination becomes closer, the larger the intensity of the temperature regulator 260 becomes. In some other embodiments, the temperature regulator 260 may be set such that the intensity thereof is increased and then decreased, or decreased and then increased, according to the progress of delivery.

When two or more articles are loaded in the loading spaces, the controller 270 may separately regulate temperature inside each of loading space based on the order of delivery or the determined delivery route described above. In an embodiment, the controller 270 may regulate an intensity of the temperature regulator 260 for each of the loading spaces based on at least one of a remaining delivery distance or a remaining delivery time for each of the articles.

As an example, the controller 270 may decrease the intensity of the temperature regulator 260 for each loading space as the remaining delivery distance or the remaining delivery time for each article decreases. Further, if the remaining delivery distance for each article decreases to below a first threshold value or the remaining delivery time decreases to below a second threshold value, the controller 270 may determine the temperature regulation level for the corresponding loading space of the article as "0." That is, the temperature regulator 260 may be turned off. In other words, the controller 270 may stop the heating or cooling of an article that is about to arrive. The first threshold value may refer to a delivery distance for which the state of the article can be maintained to an extent without artificial temperature regulation. The second threshold value may refer to a delivery time for which the state of the article can be maintained to an extent without artificial temperature regulation. The first threshold value and the second threshold value may be variously selected depending on, for example, the design purpose.

As another example, the controller 270 may increase the intensity of the temperature regulator 260 for each loading space as the remaining delivery distance or the remaining delivery time for each article decreases. In some other embodiments, the controller 270 may increase and then decrease, or decrease and then increase the intensity of the temperature regulator 260 for each loading space as the remaining delivery distance or the remaining delivery time for each article decreases.

In another embodiment, the controller 270 may regulate the intensity of the temperature regulator 260 while further considering the outdoor temperature measured by the measurer 230. For example, since the outdoor temperature is relatively high in the summer, the intensity of the heater may be regulated to be relatively lower, and the intensity of the cooler may be regulated to be relatively higher. Conversely, since the outdoor temperature is relatively low in the winter, the intensity of the heater may be regulated to be relatively higher, and the intensity of the cooler may be regulated to be relatively lower.

Regulation of Moving Speed and Tilted Angle of Stand

Changes in a traveling environment may have a relatively large influence on articles such as food. Specifically, in order to preserve the state of food containing liquid, such as a soup or stew, traveling stability is very important.

In some embodiments, the controller 270 may regulate a moving speed of the robot 200 or regulate tilted angles of the stands of the loading spaces based on a state of a road surface or an angle of inclination of the road surface.

As described above, information about the state or angle of inclination of the road surface may be included in the map information. The controller 270 may obtain the information about the state or angle of inclination of the road surface on which the robot 200 is currently traveling or is to be traveling with reference to the map information in the memory 285. In another embodiment, the robot 200 may determine a state or an angle of inclination of the road surface on which the robot 200 is currently traveling based on data from at least one of the transceiver 210, the input interface 220, or the sensor 240. It may be determined on the basis of vibrations occurring in the robot 200 whether the state of the road surface is good, and the angle of inclination of the road surface may be determined from the pose or the tilt of the robot 200.

In an embodiment, the controller 270 may regulate a moving speed of the robot 200 by controlling the travel driver 250 based on at least one of the state of the road surface or the angle of inclination of the road surface. As an example, the controller 270 may reduce the moving speed of the robot 200 when vibrations occur in the robot at a predetermined level or above or the robot 200 travels on a downhill road.

In an embodiment, the controller 270 may regulate tilted angles of the stands of the loading spaces by controlling the tilting driver 255 based on the angle of inclination of the road surface. For example, when the robot 200 travels on an uphill or downhill road, the stands may be tilted in such a direction as to offset the tilt caused by the uphill or downhill road.

Guidance for Loading Space

The battery of the robot 200 and the travel driver 250 generate heat. Thus, it may be favorable for energy efficiency to load an article having a high temperature in a loading space that is closest to the battery or the travel driver 250 among the loading spaces of the robot 200.

When the temperature of the article measured by the measurer 230 exceeds a predetermined threshold temperature, the controller 270 may guide the article to be loaded in a loading space closest to the battery or the travel driver 250. The guidance may be outputted through a display or a speaker of the output interface 280. When the loading space is capable of being opened or closed by the robot 200, the controller 270 may induce loading by opening a relevant loading space.

In FIG. 3, the battery and the travel driver 250 may be disposed under the loading space 310. Accordingly, the controller 270 may guide a corresponding article to be loaded into a loading space 310a when the measured temperature of the article exceeds a predetermined threshold temperature.

As mentioned above, the loading spaces may be classified as loading spaces including only a heater therein and loading spaces including only a cooler therein. The controller 270 may guide a corresponding article to be loaded into a loading space including a heater when the measured temperature of the article exceeds a first threshold temperature. The controller 270 may guide a corresponding article to be loaded into a loading space including a cooler when the measured temperature of the article is below a second predetermined threshold temperature.

Figure 8:
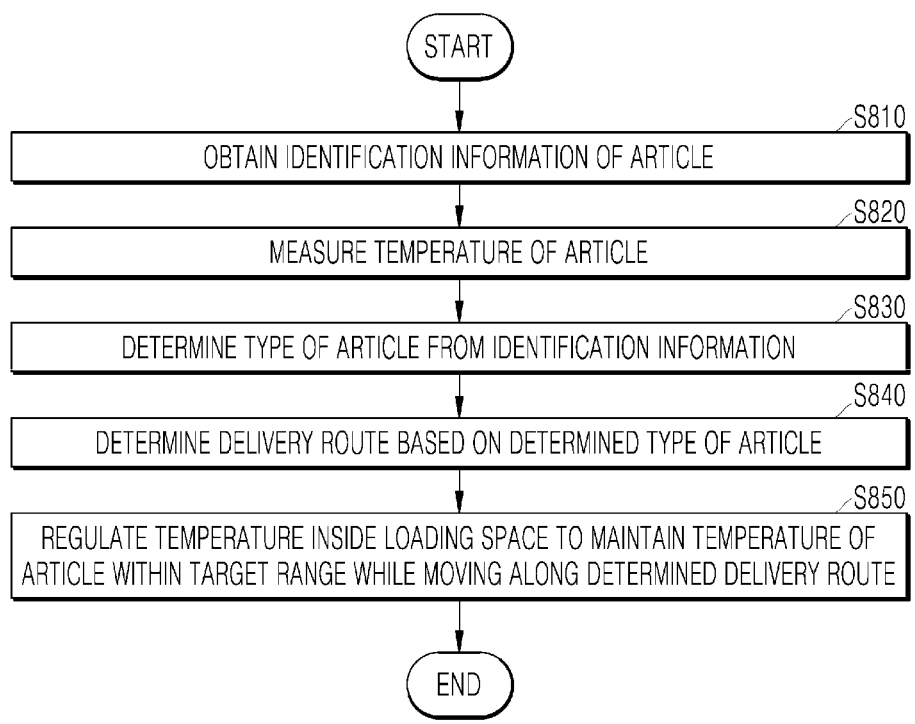
FIG. 8 is a flowchart illustrating a method for delivering articles by a robot according to an embodiment of the present disclosure.

FIG. 8 is a flowchart illustrating a method for delivering articles by a robot according to an embodiment of the present disclosure. The method, illustrated in FIG. 8, may be performed by the robot 200 of FIG. 2. The method illustrated in FIG. 8 may be applied when one article is loaded in a loading space of the robot 200.

In step S810, the robot 200 obtains identification information of the article. The robot 200 may obtain the identification information of the article through the transceiver 210 or the input interface 220. The identification information of the article may include at least one of an image, voice, or text indicating the article.

In step S820, the robot 200 measures temperature of the article. The robot 200 may measure the temperature of the article through the measurer 230. The measurer 230 may include an infrared temperature sensor capable of measuring the temperature of the article in a non-contacting manner. The measurer 230 may be disposed inside the loading space, and may also optionally be disposed in the head 320 of the robot 200. Step S820 may be performed earlier than step S810 or may be performed later than step S830 or S840.

In step S830, the robot 200 determines a type of the article from the identification information. The robot 200 may determine the type of the article by comparing the image, the voice, or the text indicating the article with article reference information stored in the memory 285. The robot 200 may use a learning model based on an artificial neural network to determine the type of the article.

In step S840, the robot 200 determines a delivery route based on the determined type of the article. The robot 200 may determine a delivery route that is most suitable for the type of the article, among candidate routes, to a delivery destination. When the article contains liquid, such as a soup or stew, the robot 200 may determine a route with a less amount of turns or a route with better road surface conditions to be the delivery route.

In step S850, while moving along the determined delivery route, the robot 200 may regulate temperature inside the loading space in which the article is loaded to maintain the temperature of the article within a target range. The target range may be set based on the article reference information stored in the memory 285. The robot 200 may determine a temperature regulation level based on a difference between the temperature of the article and the target range, and drive the temperature regulator 260 according to the determined temperature regulation level.

Figure 9:
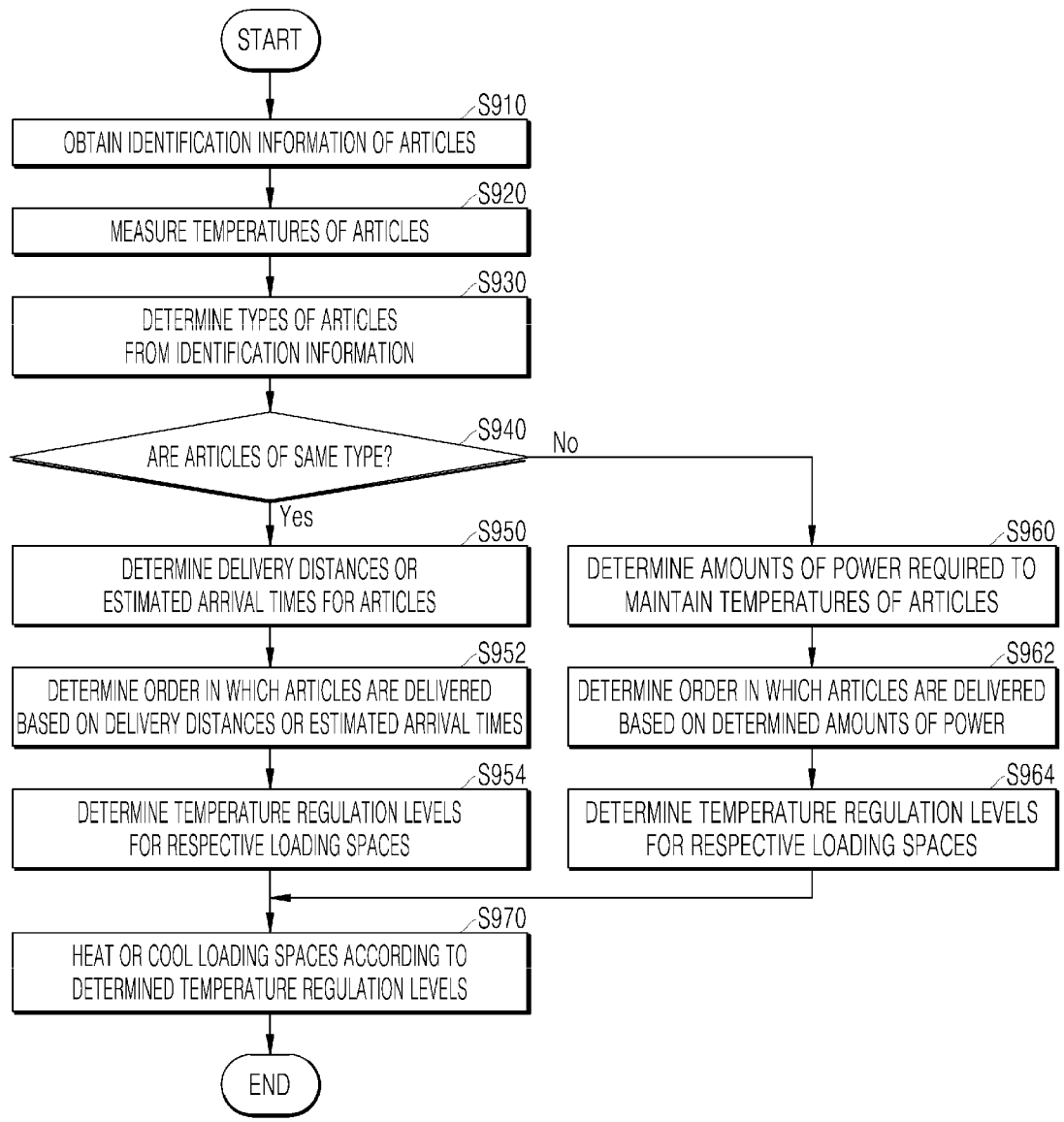
FIG. 9 is a flowchart illustrating a method for delivering articles by a robot according to another embodiment of the present disclosure.

FIG. 9 is a flowchart illustrating a method for delivering articles by a robot according to another embodiment of the present disclosure. The method, illustrated in FIG. 9, may be performed by the robot 200 in FIG. 2. The method illustrated in FIG. 9 may be applied when two or more articles are loaded in loading spaces of the robot 200. Descriptions overlapping with those for the method illustrated in FIG. 8 may be omitted.

In step S910, the robot 200 obtains identification information of the articles. The robot 200 may obtain the identification information of the articles through the transceiver 210 or the input interface 220. The identification information of the article may include at least one of an image, a voice, or a text indicating the article.

In step S920, the robot 200 measures temperatures of the articles. The robot 200 may measure temperature of each of the articles through the measurer 230.

In step S930, the robot 200 determines types of the articles from the identification information. The robot 200 may determine the types of the articles by comparing images, voices, or texts indicating the articles with article reference information stored in the memory 285. The robot 200 may use a learning model based on an artificial neural network to determine the types of articles.

In step S930, the robot 200 checks whether the articles are of the same type. When the articles are of the same type, the robot 200 performs steps S950 to S954. When the articles are of the same type, it may be favorable for battery efficiency to reduce the number of articles in the loading spaces as quickly as possible to reduce the total weight of the articles.

In step S950, the robot 200 determines delivery distances or estimated arrival times for the articles.

In step S952, the robot 200 determines an order in which the articles are delivered based on the delivery distances or the estimated arrival times for the articles. The robot 200 may determine the order in which the articles are delivered such that an article with a shorter delivery distance or a shorter estimated delivery time is delivered earlier.

In step S954, the robot 200 determines a temperature regulation level for each of the loading spaces based on the determined order of delivery.

When the articles are not of the same type, the robot 200 performs steps S960 to S964. When the articles are not of the same type, it may be more favorable for battery efficiency to deliver an article requiring a larger amount of power to maintain the temperature thereof earlier.

In step S960, the robot 200 determines an amount of power required to maintain the temperature of each of the articles. The amount of power may be an amount of power per unit time or per unit distance.

In step S962, the robot 200 determines an order in which the articles are delivered based on the determined amount of power. The robot 200 may determine the order in which the articles are delivered with reference to the amount of power per unit time and the location of the delivery destination for each of the article. The robot 200 may estimate a total amount of power required to deliver all of the articles, and determine the order in which the articles are delivered in such a manner to minimize the total required amount of power.

In step S964, the robot 200 determines a temperature regulation level for each of the loading spaces based on the determined order of delivery.

In step S970, while moving along the determined delivery route, the robot 200 operates the temperature regulator 260 according to the determined temperature regulation level to heat or cool the loading spaces.

Figure 10:
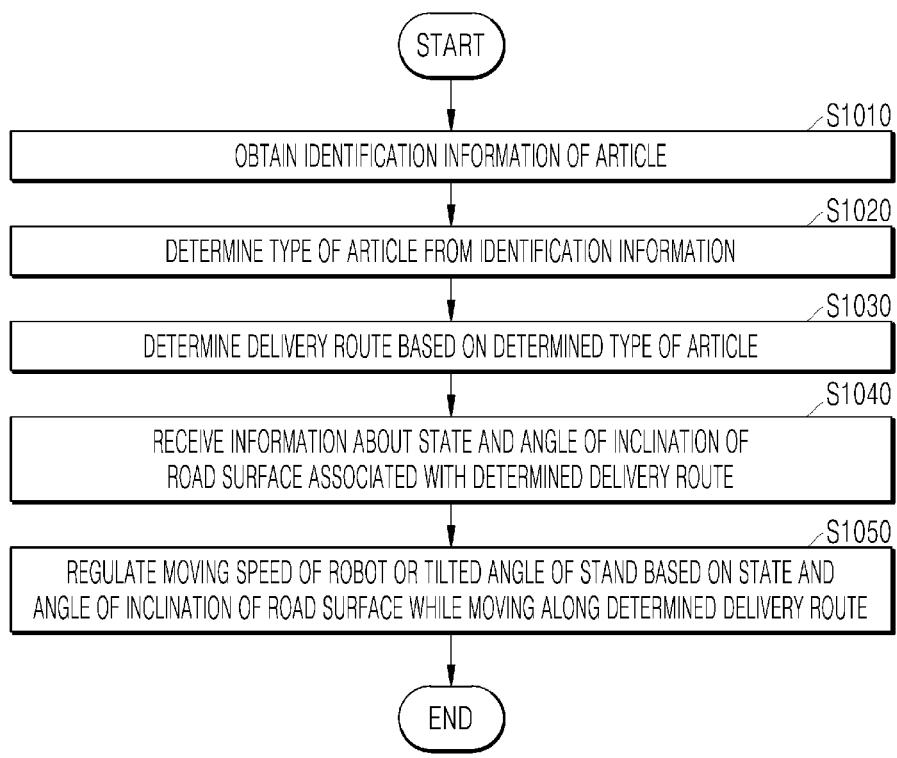
FIG. 10 is a flowchart illustrating a method for delivering articles by a robot according to still another embodiment of the present disclosure.

FIG. 10 is a flowchart illustrating a method for delivering articles by a robot according to still another embodiment of the present disclosure. The method, illustrated in FIG. 10, may be performed by the robot 200 in FIG. 2. Descriptions overlapping with those for the method illustrated in FIG. 8 may be omitted.

Steps S1010 to S1030 are substantially the same as steps S810 to S830 of FIG. 8.

In step S1040, the robot 200 may receive information about a state of a road surface and an angle of inclination of a road surface associated with the determined delivery route from an external device such as the control server 120 or the terminal 130. When the information about the state of the road surface and the angle of inclination of the road surface is already stored in the memory 285 of the robot 200, step S1040 may be omitted.

In step S1050, while moving along the determined delivery route, the robot 200 may regulate a moving speed of the robot 200 or regulate tilted angles of the stands of the loading spaces based on the state of the road surface and the angle of inclination of the road surface.

Referring back to FIG. 2, in an embodiment, the robot 200 may further include a learning processor 290 to perform operations related to artificial intelligence and/or machine learning.

Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyper parameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

The learning processor 290 may allow a model, composed of an artificial neural network to be trained using learning data. Here, the trained artificial neural network may be referred to as a trained model. The trained model may be used to infer a result value with respect to new input data rather than learning data, and the inferred value may be used as a basis for a determination to perform an operation of classifying the detected hand motion.

The learning processor 290 may train an artificial neural network by using one or more of the various input data used to determine the type of article as learning data.

In an embodiment, the learning processor 290 may train the artificial neural network to output the type of article using an image, a voice, or a text corresponding to the type of article as learning data.

In an embodiment, the learning processor 290 may determine the type of article by using, as input data for the learning model based on the artificial neural network, a captured image of the article, a voice uttering the name of the article, a text inputted to indicate the name of the article, or any combination thereof.

Figure 11:
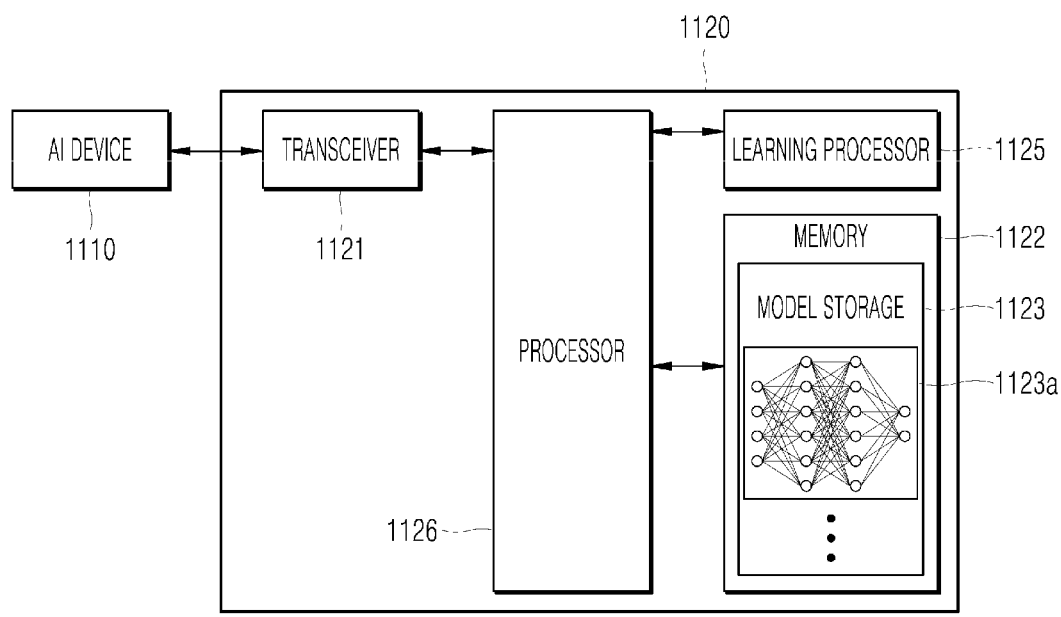
FIG. 11 is a diagram illustrating a robot system according to another embodiment of the present disclosure.

The learning processor 290 may perform artificial intelligence and/or machine learning processing together with a learning processor 1125 of an AI server 1120 of FIG. 11. The learning processor 290 may include a memory integrated or implemented in the robot 200. Alternatively, the learning processor 290 may be implemented by using the memory 285, an external memory directly coupled to the robot 200, or a memory maintained in an external device.

FIG. 11 is a diagram illustrating a robot system according to another embodiment of the present disclosure. In an embodiment, a robot system may be implemented as an AI system capable of performing artificial intelligence and/or machine learning. Referring to FIG. 11, a robot system according to another embodiment of the present disclosure may include an AI device 1110 and an AI server 1120.

In an embodiment, the AI device 1110 may be the robot 110, the control server 120, the terminal 130 of FIG. 1, or the robot 200 of FIG. 2. The AI server 1120 may be the control server 120 of FIG. 1.

The AI server 1120 may refer to a device training an artificial neural network using a machine learning algorithm or using a trained artificial neural network. The AI server 1120 may be composed of a plurality of servers to perform distributed processing. The AI server 1120 is included as a configuration of a portion of the AI device 1110, and may perform at least a portion of the artificial intelligence and/or machine learning processing.

The AI server 1120 may include a transceiver 1121, a memory 1122, a learning processor 1125, and a processor 1126.

The transceiver 1121 may transmit and receive data with an external device such as the AI device 1110.

The memory 1122 may include a model storage 1123. The model storage 1123 may store a model (or an artificial neural network 1123a) learning or learned through the learning processor 1125.

The learning processor 1125 may train the artificial neural network 1123a using learning data. The learning model may be used while mounted in the AI server 1120 of the artificial neural network, or may be used while mounted in an external device such as the AI device 1110.

The learning model may be implemented as hardware, software, or a combination of hardware and software. When a portion or the entirety of the learning model is implemented as software, one or more instructions, which constitute the learning model, may be stored in the memory 1122.

The processor 1126 may infer a result value with respect to new input data by using the learning model, and generate a response or control command based on the inferred result value.

The example embodiments described above may be implemented through computer programs executable through various components on a computer, and such computer programs may be recorded on computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations can be made depending on design conditions and factors within the scope of the appended claims or equivalents thereof.

The present disclosure is not limited to the example embodiments described above, and rather intended to include the following appended claims, and all modifications, equivalents, and alternatives falling within the spirit and scope of the following claims.

What is claimed is:

1. A robot comprising:
   one or more loading spaces configured to load one or more articles;
   a travel driver configured to move the robot;
   an input interface configured to obtain identification information of the one or more articles;
   one or more temperature sensors configured to measure temperature of each of the one or more articles;
   a temperature regulator configured to heat or cool the one or more loading spaces; and
   a controller configured to:
      determine a type of each of the one or more articles from the identification information;
      determine whether the one or more articles loaded in the one or more loading spaces are of the same type;
      determine an order in which the one or more articles are delivered based on whether the one or more articles are of the same type;
      determine a delivery route based on the determined type of the article; and
      control the temperature regulator based on the measured temperature of each of the one or more articles while controlling the travel driver such that the robot moves along the determined delivery route.

2. The robot according to claim 1, wherein when the one or more articles are of the same type, the controller is configured to determine the order in which the one or more articles are delivered based on a delivery distance or an estimated delivery time for each of the one or more articles.

3. The robot according to claim 1, wherein when the one or more articles are not of the same type, the controller is configured to determine the order in which the one or more articles are delivered based on an amount of power per unit time or per unit distance required to maintain the temperature of each of the one or more articles within a target range.

4. The robot according to claim 3, wherein the controller is further configured to:
   determine candidate routes based on delivery destination information of the one or more articles;
   for each of the candidate routes, estimate a total amount of power required for delivering all of the one or more articles based on the amount of power per unit time or per unit distance; and
   determine the order in which the one or more articles are delivered according to a candidate route estimated to require the lowest total amount of power.

5. A robot comprising:
   one or more loading spaces configured to load one or more articles;
   a travel driver configured to move the robot;
   an input interface configured to obtain identification information of the one or more articles;
   one or more temperature sensors configured to measure temperature of each of the one or more articles;
   a temperature regulator configured to heat or cool the one or more loading space; and
   a controller configured to:
      determine a type of each of the one or more articles from the identification information;
      determine a delivery route based on the type of the article;
      control the temperature regulator based on the measured temperature of each of the one or more articles while controlling the travel driver such that the robot moves along the determined delivery route;
      set a target range based on a recommended temperature corresponding to the determined type of the article;

compare the measured temperature of each of the one or more articles with the set target range; and control the temperature regulator based on the comparison result.

6. The robot according to claim 5, wherein the controller is configured to determine an intensity of the temperature regulator based on a difference between the measured temperature of each of the one or more articles and the target range.

7. The robot according to claim 6, wherein the controller is configured to decrease the intensity of the temperature regulator as the difference between the measured temperature of each of the one or more articles and the target range decreases.

8. The robot according to claim 7, wherein when the measured temperature of each of the one or more articles is within the set target range, the controller is configured to turn off the temperature regulator.

9. The robot according to claim 6, wherein the controller is configured to regulate the intensity of the temperature regulator according to a temperature regulation profile corresponding to the determined type of the article.

10. The robot according to claim 9, wherein the temperature regulation profile is set to decrease the intensity of the temperature regulator continuously or discontinuously according to progress of delivery.

11. The robot according to claim 10, wherein the temperature regulation profile is set to turn off the temperature regulator when a remaining delivery distance for each of the one or more articles decreases to below a first threshold value or a remaining delivery time for each of the one or more articles decreases to below a second threshold value.

12. The robot according to claim 10, wherein the temperature regulation profile is set to increase the intensity of the temperature regulator continuously or discontinuously according to the progress of delivery.

13. The robot according to claim 6, wherein the one or more temperature sensors are further configured to measure an outdoor temperature, and the controller is configured to regulate the intensity of the temperature regulator based on the measured outdoor temperature.

14. A method for delivering articles by a robot, comprising:

obtaining identification information of one or more articles loaded in one or more loading spaces of the robot;

measuring temperature of each of the one or more articles;

determining a type of each of the one or more articles from the identification information;

determining whether the one or more articles loaded in the one or more loading spaces are of the same type;

determining an order in which the one or more articles are delivered based on whether the one or more articles of the same type;

determining a delivery route based on the determined type of the article; and heating or cooling the one or more loading spaces in which the one or more articles are loaded, based on the measured temperature of each of the one or more articles, while moving along the determined delivery route.

15. The method according to claim 14, wherein determining the order in which the one or more articles are delivered comprises:

when the one or more articles are of the same type, determining an order in which the one or more articles are delivered based on a delivery distance or an estimated delivery time for each of the one or more articles; and when the one or more articles are not of the same type, determining an order in which the one or more articles are delivered based on an amount of power per unit time or per unit distance required to maintain the temperature of each of the one or more articles within a target range.

16. A method for delivering articles by a robot, comprising:

obtaining identification information of one or more articles loaded in one or more loading spaces of the robot;

measuring temperature of each of the one or more articles;

determining a type of each of the one or more articles from the identification information;

determining a delivery route based on the determined type of the article;

heating or cooling the one or more loading spaces in which the one or more articles are loaded, based on the measured temperature of each of the one or more articles, while moving along the determined delivery route;

setting a target range based on a recommended temperature corresponding to the determined type of the article; and regulating an intensity of the heating or cooling based on a difference between the measured temperature of each of the one or more articles and the target range.

17. The method according to claim 16, wherein regulating the intensity of the heating or cooling further comprises decreasing an intensity of the heating or cooling as the difference between the measured temperature of each of the one or more articles and the set target range decreases.

18. The method according to claim 16, wherein regulating the intensity of the heating or cooling further comprises at least one of:

regulating the intensity of the heating or cooling according to a temperature regulation profile corresponding to the determined type of the article; or regulating the intensity of the heating or cooling based on an outdoor temperature.

19. A method for delivering articles by a robot, comprising:

obtaining identification information of one or more articles loaded in one or more loading spaces of the robot;

measuring temperature of each of the one or more articles;

determining a type of each of the one or more articles from the identification information;

determining a delivery route based on the determined type of the article; and heating or cooling the one or more loading spaces in which the one or more articles are loaded, based on the measured temperature of each of the one or more articles, while moving along the determined delivery route, wherein the identification information comprises at least one of an image, voice, or text indicating each of the one or more articles, wherein determining the type of the article further comprises determining the type of the article by inputting the identification information to a learning model which is based on an artificial neural network, and wherein the artificial neural network is trained to output the type of the article corresponding to the image, the voice, or the text indicating each of the one or more articles.

* * * * *